UNITED STATES PATENT OFFICE.

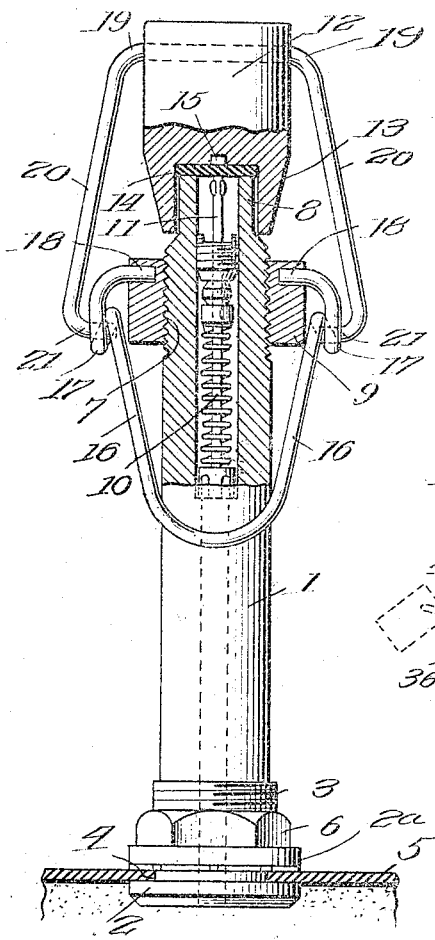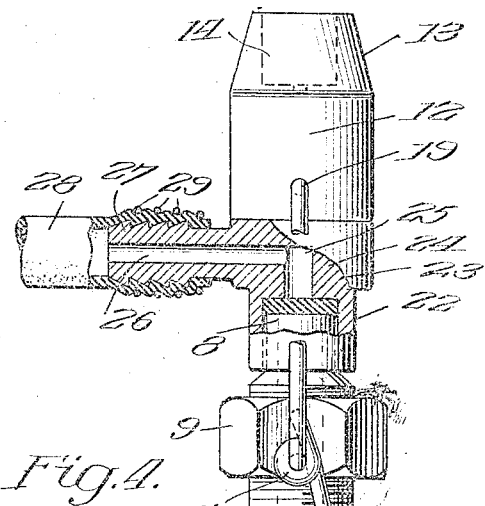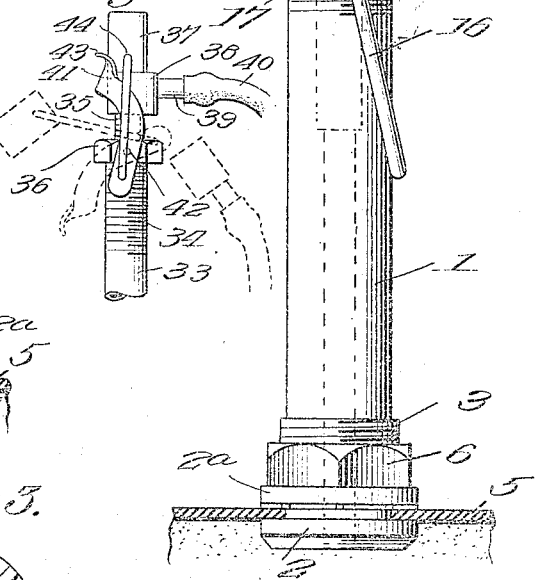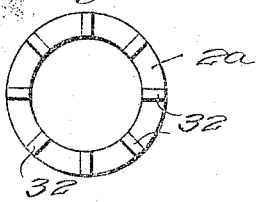

ALFRED BELIVEAU, OF PROVIDENCE, RHODE ISLAND.

AUTOMATIC VALVE AND HOSE COUPLING AND DUST-CAP FOR PNEUMATIC TIRES.

1,159,333.     Specification of Letters Patent.     Patented Nov. 2, 1915.

Application filed January 8, 1915. Serial No. 1,121.

*To all whom it may concern:*

Be it known that I, ALFRED BELIVEAU, a subject of the King of England, and a resident of Providence, in the county of Providence and State of Rhode Island, have invented a new and useful Improvement in Automatic Valve and Hose Couplings and Dust-Caps for Pneumatic Tires, of which the following is a specification.

My invention is an improvement in automatic valve and hose couplings and dust caps for pneumatic tires, and has for its object to provide mechanism of the character specified, for connecting the dust cap to the valve casing in such manner that the cap may be quickly released or replaced, and may be used to clamp the air connector on the valve casing.

In the drawings:—Figure 1 is a side view of the improved valve with parts in section, Fig. 2 is a view at right angles to Fig. 1, showing the air hose coupling connected, Fig. 3 is a top plan view of the washer, and Fig. 4 is a side view of a modified construction.

As is known, a large amount of damage and wear on pneumatic tires is due to running them without sufficient internal pressure. Drivers do not pay sufficient attention to the pressure because of the inconvenience, the inaccessibility of the parts, and the time consumed in the necessary inspection and attention. In addition with the ordinary form of valves, it is necessary to unscrew caps or valves in order that the lack of pressure may be attended to, and the parts must be screwed back into place after the filling of tire. In addition the threads become worn or fouled with dirt or grit, thus making their use uncertain, and annoying. Also special tools must be used, as for instance, wrenches or pliers, either when inspecting or when pumping up the tires to remove the dust cap and valve cap. Because of the position of the valve, it becomes covered with dust and grit, thus making the inspection and the inflating both difficult and unpleasant.

The present invention is designed to cure these difficulties with a special form of valve coupling and dust cap.

In Fig. 1 is shown the usual position of the parts, the valve casing 1 having at one end a marginal rib 2, and the body is externally enlarged and threaded as indicated at 3 adjacent to the rib. The end provided with the rib is designed to be passed through an opening 4 in the shoe or casing 5, and a nut or washer 6 is engaged with the threaded portion 3, the nut coöperating with the rib 2 to clamp the edges of the opening in the shoe.

Near its opposite end the body or casing is externally threaded as indicated at 7, and beyond the threaded portion the end of the body is reduced annularly externally as indicated at 8. A nut 9 is threaded on to the threaded portion 7, and the nut supports a yoke or bracket to be later described.

The usual valve mechanism indicated generally at 10 is arranged within the bore of the casing, being supported by a stem 11, arranged at the axis of the casing in the usual manner, and the stem extends beyond the valve mechanism at the outer end of the stem to the said outer end as shown in Fig. 1. The cap 12 is preferably a solid cylindrical body having one end externally tapered as shown at 13, and at the said end the cap is provided with a recess or socket 14 for receiving the reduced portion 8 of the casing.

The recess or socket 14 is cylindrical or circular in cross section, and at the center of the recess the cap is provided with a depression 15 in which the outer end of the stem 11 fits.

The yoke or bracket, before mentioned, is approximately V-shaped, comprising arms 16 integrally connected on an arc or curve and diverging slightly from each other toward their free ends, and each arm is provided with an eye 17 near its free end, the eye being formed in the present instance by a coil in the material from which the yoke or bracket is composed.

In the present instance the yoke or bracket is composed of a wire of suitable weight, and beyond the eye 17 each arm is provided with an angular inwardly extending journal pin 18, journaled in a radial opening in the nut. The yoke is free to swing on the nut, and a substantially U-shaped member comprising a body 19 and arms 20 is connected with the cap for coöperating with the yoke or bracket 16—17—18.

The body 19 of the U-shaped member or bracket extends through a diametrical opening in the cap while the arms 20 extend approximately longitudinally of the cap, diverging slightly from each other however, and each arm is provided at its free end with an inwardly extending journal pin 21, The journal pins 21 engage the eyes 17 of the yoke or bracket, thus pivotally connecting the yoke or bracket to the U-shaped member. When the cap is in place as shown in Fig. 1 the reduced end 8 of the casing fits within the socket or recess 14, and the cap closes the outer end of the casing. When the yoke or bracket 16—17—18 is in the position of Fig. 1, the cap is firmly held on the casing and is held from displacement with respect to the casing. The adjustment of the nut 9 is made before clamping the cap on the casing.

When it is desired to release the cap it is only necessary to swing the yoke outwardly and upwardly after loosening the nut when the cap will be lifted off the outer end of the casing, and may be swung to one side riding on the arms 20 of the U-shaped member.

It will be evident that when the bracket 16—17—18 is swung upwardly and outwardly, the bearing eyes 17 will be moved outwardly and upwardly, thus permitting the cap to lift away from the casing. When the yoke or bracket 16—17—18 is swung downwardly into the position of Fig. 1 the cap is firmly locked on the body or casing. In this position the arms 20 of the U-shaped member or bracket are parallel with the axis of the casing 1, the eyes 17 being at diametrically opposite points with respect to the casing. By means of the nut the pressure of the cap on the casing may be varied within wide limits.

In Fig. 2 is shown the method of applying the air hose connection. It will be noted from an inspection of Figs. 1 and 2 that the opposite end of the cap 12 from the socket 14 is plane and perpendicular to the axis of the cap. The body 19 of the bracket 19—20—21 is journaled in the cap 12 near its plane end, and when the cap is turned into the position shown in Fig. 2, that is, with the socket 14 outwardly, there will be a considerable space between the plane end of the cap and the outer end of the casing 1.

The hose connection is in the form of a cap 22, having a socket 23 for receiving the reduced end 8 of the casing 1, and of greater depth than the length of the reduced portion, and the inner end of the socket tapers as indicated at 24 to a central recess 25, with which communicates the bore 26 of a lateral tubular extension 27. The extension 27 is adapted to receive one end of a hose 28, and the said extension is annularly grooved externally to prevent slipping of the hose.

A wire 29 or the like is wrapped around the tube, the laps or coils of the wire engaging the hose at the grooves to hold the hose in place. It will be understood that a pump is connected with the outer end of the tube 28 for supplying the air hose 25 with air. The outer end of the cap 22 is enlarged to the same diameter as the cap 12, and the said outer end is plane for engaging the plane end of the cap 12.

The cap 22 is of such length that when fitted over the reduced portion 8 of the casing 1 the plane end of the cap 12 may be engaged with the plane end of the cap 22 and when the lever or yoked-shaped bracket 16—17—18 is swung into the position of Fig. 1, the parts are clamped firmly together, that is, the cap 12 clamps the air cap 22 in place on the casing 1.

The valve mechanism indicated generally at 10 is arranged to admit air to the hose or casing when the pump is in operation, and to prevent the return of the air. After the tire is provided with the required pressure, the lever 16—17—18 is swung upward into releasing position, and the cap 12 is swung to the right of Fig. 2. The cap 22 may now be lifted off the reduced portion of the casing 1, after which the cap 12 is reversed, the socket 14 being engaged with the reduced end 8 of the casing, and the lever 16—17—18 is swung downwardly into locking position, that is, into the position of Fig. 1.

It will be evident from the description that to pump up the air it is only necessary to swing the lever 16—17—18 into releasing position, swing the cap 12 to one side, the cap swinging on the arms 20 of the bracket 19—20, place the cap 22, seat the cap in the position of Fig. 2, swing the lever 16—17—18 to locking position, and the air may then be pumped up. After pumping the lever 16—17—18 is released, the cap 12 swung to one side, the cap 22 removed, the cap 12 reversed and again locked in place. The entire operation of removing the cap 12 and placing the air connection occupies but a very slight amount of time.

In addition the improved cap reinforces the valve, so that should the valve become leaky the cap will prevent loss of air. There are no threads to become worn and by means of the nut 9, the cap 12 may be held as tightly as may be desired in place on the casing 1. No tools are required, either to remove or replace the cap and there is no strain of any kind or character on the valve or any of the parts in removing or replacing the cap or connector. With the improved cap the position of the valve with respect to the wheel is immaterial.

A gasket or packing ring 30 is arranged in the socket 14 between the upper end of the casing and the bottom of the socket to form a fluid tight joint. The socket in the cap 22 is also provided with a gasket 31 for the same purpose. The casing 1 is connected to the shoe or casing 5 by means of the flange 2 and the nut 6, and a washer 2ª is arranged between the nut and the outer surface of the shoe or casing. This washer as shown more particularly in Fig. 3 has radial ribs 32 on its under face, which embed themselves in the material of the shoe or casing to prevent rotation of the washer and of the casing 1.

In the embodiment of the invention shown in Fig. 4 the casing 33 is threaded near its upper end as indicated at 34 and has a reduced externally threaded portion 35 above the threaded portion 34. The nut 36 corresponding to the nut 9 in Figs. 1 and 2 is threaded on to the portion 34. The cap 37 is similar to the cap 12, except that it is not beveled at the end adjacent to the socket, and the hose connector comprises a head 38, adapted to be arranged between the cap and the casing 33, the cap having a socket provided with a gasket for receiving the reduced portion 35 of the casing. The cap also has a lateral nipple 39 for engagement by the hose 40 which connects the connector with an air pump or the like.

A U-shaped lever 41 is journaled on the nut, the arms of the lever being pivoted to the nut at opposite sides thereof as indicated at 42, and the body of the lever is extended to form a finger piece 43. The pivotal connection 42 is between the body of the lever and the free ends of the arms, and a U-shaped bracket 44 is provided for connecting the cap with the lever. The body of the bracket passes through a diametrical opening in the cap, and the arms are pivoted to the ends of the arms of the lever 41.

The arrangement in this case is such that the cap is locked in place by swinging the body of the lever upward instead of downwardly as shown in Figs. 1 and 2. In dotted lines is shown the position of the parts when the connector is disengaged, the cap swinging to one side on the U-shaped bracket 41 to permit the removal of the connector.

I claim:—

1. In combination with the pneumatic air valve casing and the valve mechanism therein, of a nut threaded on to the casing near the outer end thereof, said outer end being externally reduced beyond the nut and the nut being adjustable longitudinally of the casing, of a cap of cylindrical form having at one end a socket for receiving the reduced outer end of the casing and having the other end plane and perpendicular to the axis of the cap, a substantially U-shaped bracket comprising a body journaled diametrically of the cap near the plane end and arms extending longitudinally of the cap and the nut, each arm having an inwardly extending pin at the end remote from the cap, a substantially yoke- or U-shaped bracket comprising a body extending transversely of the casing and arms extending longitudinally of the casing and having at their outer ends inwardly extending journal pins, the nut having radial openings for receiving the pins, and each arm having intermediate its ends and near the journal pin a bearing for receiving the journal pin of the adjacent arm of the cap bracket, and an air connection comprising a cap having a socket for receiving the reduced end of the casing and having a lateral extension for engagement by an air hose, the outer end of the cap being plane and adapted to be engaged by the plane end of the first-named cap.

2. The combination with the valve casing, of a cap having at one end means for engaging and closing the end of the casing, the opposite end being approximately plane and approximately perpendicular to the axis of the cap and adapted to engage the outer end of an air connector fitting between the said end of the cap and the casing, a support for the cap adjustable longitudinally of the casing, a swinging connection between the support and the cap for permitting one end of the cap to be engaged with the end of the casing or for permitting the other end to be engaged with the connector, and means in connection with the said swinging connection for forcing the cap toward the casing in either position, and for locking the cap in such position.

ALFRED BELIVEAU.

Witnesses:
Sylvester T. Goss,
Amie M. Wilcox.